United States Patent
Terschueren

(10) Patent No.: US 7,851,015 B2
(45) Date of Patent: Dec. 14, 2010

(54) PROCESS FOR MAKING TAPE USEFUL AS A TIRE CAP PLY FROM GREIGE FABRIC

(76) Inventor: Walter Terschueren, Bergstrasse 6, 37281 Wanfried-Aue, Bergstrasse (DE)

( * ) Notice: Subject to any disclaimer, the term of this patent is extended or adjusted under 35 U.S.C. 154(b) by 0 days.

(21) Appl. No.: 12/401,006

(22) Filed: Mar. 10, 2009

(65) Prior Publication Data
US 2009/0165930 A1 Jul. 2, 2009

Related U.S. Application Data

(62) Division of application No. 10/651,363, filed on Aug. 29, 2003, now abandoned.

(51) Int. Cl.
*B05D 5/10* (2006.01)
(52) U.S. Cl. .................... 427/207.1; 152/526; 152/527; 152/536
(58) Field of Classification Search .............. 427/207.1; 152/526, 527, 536
See application file for complete search history.

(56) References Cited

U.S. PATENT DOCUMENTS

| | | | |
|---|---|---|---|
| 2,098,037 A | 12/1937 | Hazell et al. | |
| 2,098,038 A | 12/1937 | Hazell et al. | |
| 2,754,239 A | 7/1956 | Robison | |
| 2,895,850 A | 7/1959 | Robison et al. | |
| 3,039,906 A | 6/1962 | Baldwin et al. | |
| 3,224,922 A | 12/1965 | Fry, Jr. | |
| 3,534,782 A * | 10/1970 | Young et al. | 139/426 R |
| 3,613,762 A | 10/1971 | Reinhart, Jr. | |
| 3,645,817 A | 2/1972 | Walker et al. | |
| 3,674,078 A | 7/1972 | Sasaki et al. | |
| 3,774,662 A | 11/1973 | Neville et al. | |
| 3,878,813 A | 4/1975 | Roberson et al. | |
| 3,897,289 A * | 7/1975 | Di Paola | 156/88 |
| 4,050,973 A | 9/1977 | Neville et al. | |
| 4,094,354 A | 6/1978 | Ferrell et al. | |
| 4,131,584 A | 12/1978 | Burke, Jr. et al. | |
| 4,143,008 A | 3/1979 | Zwolinski et al. | |
| 4,201,260 A | 5/1980 | Mirtain et al. | |
| 4,274,821 A | 6/1981 | Kiemer | |
| 4,935,301 A | 6/1990 | Rerup et al. | |
| 5,246,051 A | 9/1993 | Inada et al. | |
| 2002/0139465 A1 * | 10/2002 | Fidan et al. | 152/563 |
| 2003/0166743 A1 * | 9/2003 | Huynh-Tran et al. | 523/205 |

FOREIGN PATENT DOCUMENTS

| | | |
|---|---|---|
| EP | 651665 | 4/1951 |
| EP | 843804 | 8/1960 |
| EP | 868954 | 5/1961 |

(Continued)

*Primary Examiner*—Michael Kornakov
*Assistant Examiner*—Xiao Zhao
(74) *Attorney, Agent, or Firm*—McCarter & English

(57) ABSTRACT

An apparatus and process are used to make a ready-to-apply tape from greige fabric. This tape can be used as cap plies, breakers and reinforcement in the carcass of tires. The tape is made by dipping a greige mini-fabric which comprises a plurality of single end cords in a solvent-based cement. The cement, which comprises solvent and an elastomeric composition, is dried so that the majority of the solvent evaporates. The elastomeric composition remains, encapsulating the fabric, thereby forming the tape.

6 Claims, 5 Drawing Sheets

FOREIGN PATENT DOCUMENTS

| | | |
|---|---|---|
| EP | 898518 | 6/1962 |
| EP | 1440081 | 6/1976 |
| EP | 0712739 | 5/1996 |
| GB | 2126502 | 3/1984 |
| WO | WO9613544 | 5/1996 |

* cited by examiner

PROCESS FOR MAKING TAPE USEFUL AS A TIRE CAP PLY FROM GREIGE FABRIC

CROSS REFERENCE TO RELATED APPLICATIONS

This application is a Divisional of U.S. patent application Ser. No. 10/651,363, filed Aug. 29, 2003, now abandoned.

FIELD OF THE INVENTION

The present invention relates to an apparatus and a process for making tape which can be used as cap plies, breakers and reinforcement in the carcass of tires, and in particular, an apparatus and process for making such a tape from greige fabric. The tape can be produced to the dimensions of the application, such as a cap ply of a specified number of ends.

DESCRIPTION OF THE RELATED ART

The tire industry has long had considerable interest in belted tire constructions for reinforcing tires. An example of a tire reinforcement is described in U.S. Pat. No. 3,720,569 to Kimble. This reinforcement is formed by passing a plurality of cords in the desired spaced relationship through an extruder. The cords may be coated with a rubber latex in a multiple dip operation to form a unitary strip. Such reinforcement constructions may offer the advantage of better road stability and longer tread life in both radial and bias ply constructions. However, such constructions are subject to belt-edge separation failures because the adhesion of the reinforcement to the tire rubber is inadequate.

Cap plies that envelop radial tire belts may be used to help minimize such belt-edge separation failures. Initially, cap plies were applied as a full width strip with an overlap splice. Experience has shown that the splice could pull open during curing. In addition, there is a limitation on the extension of the belt, since the cap ply is applied over the belt. Moreover, with this configuration, the same width of material must be applied across the whole belt. As a result of these limitations, a narrower cap ply tape was developed in the 1990's. This tape is spirally wound about the belt. Such a tape is made by slitting rubberized fabric. The width of the tape depends on the number of cords per inch, which varies according to the tire manufacturer. It was found that such a tape can increase winding tension, as there is no splice. Also, such a tape can be applied in extra layers at the belt edges to improve tire performance. However, this process is dependent on several processes/steps, i.e., weaving fabric, treating fabric to achieve good adhesion to the calendered rubber, compounding rubber, skimming or calandering the rubber onto the treated fabric and slitting the rubberized fabric to specific widths. These are inherently high cost/labor intensive procedures. Because of the slitting step, there may be cut cords on the edges of the tape, which may create edge fray. Consequently, such a process produces a fair amount of scrap material. Moreover, the tape so produced can be non-uniform, due to the possible varying number of single end cords in each strip. With each step the potential for error and the additive variances requires allowance for excessive tolerances in the tire building process. Finally, the addition of rubber to ensure good adhesion of the fabric to the tire rubber adds to the overall weight of the tire.

The process for making belt cord fabric is similar to the slit fabric process in that it includes treating fabric, with, for example, an rfl dip to achieve good adhesion. However, the belt cord fabric differs in significant ways: the weft cord is identical to the warp cord, the fabric is ready-to-use in the belt building process in that it does not require slitting, and the fabric does not require a rubberizing step.

Because of the inherent drawbacks in the slit rubberized fabric process, a process for the preparation of a cap ply tape from single end cords using a cross-head extruder has been developed. Such a process is commonly known as the STEELASTIC® Cap Strip System, and is illustrated in FIG. 1. In the STEELASTIC® Cap Strip System, shown generally at 1, a plurality of cords 2 and rubber 3 are brought into a die head 4, where the cords are encapsulated by rubber to give a good adhesion to the tire rubber. A tape which comprises a plurality of rubberized single end cords is thus formed. The cords must be treated with a resourcinol-formaldehyde latex dip before they are brought into the die head to ensure good adhesion to the rubber introduced in the extrusion step.

The STEELASTIC® Cap Strip System provides improved uniformity as compared to the slit rubberized fabric process, since there no possibility of uneven slitting and hence there is exact control of the number of single end cords in the tape. Moreover, this process has reduced scrap as compared to the slit rubberized fabric process, since there are no cut cords on the edges of the tape. In addition, longer lengths per roll of tape are possible with the STEELASTIC® Cap Strip System. However, the extruder and the die heads used in this process represent a major capital investment. Moreover, the tape itself is still dependent on a rubber compounding step and the addition/application of rubber as a means to ensure good adhesion to the tire rubber compounds, hence increasing weight and cost. In addition, the STEELASTIC® Cap Strip System requires above ambient pressures and temperatures. Therefore, there exists a need in the tire industry to develop a process for making tape or strip which can be used as cap plies, breakers and reinforcement in the carcass of tires, which is less capital intensive and less labor intensive than processes of the prior art. Moreover, there needs to be a process which produces more uniform tape and which does not produce waste. In addition, it would be desirable to produce a packaged tape or strip which is ready to apply to a tire as a cap ply or which can be used as breakers and reinforcement in the carcass of tires.

BRIEF SUMMARY OF THE INVENTION

Applicants have recognized that cement flows much better than rubber, and that the use of cement for encapsulating single end cords is superior to the rubber used in the STEELASTIC® Cap Strip System. In addition, applicants have recognized that cement can be applied at ambient temperature and ambient pressure, as opposed to rubber in the STEELASTIC® Cap Strip System, which must be applied in a heated extruder. Thus, the present invention overcomes the problems associated with the prior art by providing a process which does not require the use of extruder dies as in the STEELASTIC® Cap Strip System.

In addition, the process of the present invention is not as labor intensive as the slit rubberized fabric process of the prior art, as it does not involve slitting of fabric. In addition, it is not as capital intensive as the slit rubberized fabric process, as it does not require a calendar roll. Moreover, the process of the present invention avoids the potential for error in that it does not have a slitting step, and hence the possibility of non-uniformity due to the possible varying number of single end cords in each strip is virtually eliminated. Also, since there is no slitting step in the process of the present invention, no edge fray is created and there are no cut cords on the edges of the tape. Thus, the process of the present invention produces less scrap than the slit rubberized fabric process. Finally, the overall weight of the tire could be reduced, since there is no need to add rubber to ensure good adhesion of the fabric to the tire rubber.

Therefore, in accordance with the present invention, there is provided a process for making a tape from a fabric. The process comprises dipping a fabric comprising a plurality of single end cords in a solvent-based cement that includes an elastomeric composition dissolved in a solvent, and drying the cement so that the majority of the solvent evaporates, thereby forming a tape comprising the fabric encapsulated in the elastomeric composition. The resulting ready-to-apply tape can be produced to the dimensions of the application, such as a cap ply of ten ends.

DETAILED DESCRIPTION OF THE INVENTION

In accordance with the present invention, there is provided an apparatus and a process for making strip, or tape which can be used as cap plies, breakers and reinforcement in the carcass of tires. The process of the present invention will be described in the context of the operation of the apparatus of the present invention with respect to FIGS. 2-7. The tape is made from a greige "belt-cord fabric" (as opposed to "tire-cord fabric"), or mini-fabric, which comprises a plurality of single ends cords. This belt-cord fabric can be made on a fabric loom, such as a fabric loom which is commercially available from Jakob Muller, AG, of Frick, Switzerland. This machine can be set to make fabric which has a width smaller than traditional tire-cord fabric used in the slit rubberizerd-fabric process. The width of the greige fabric is the width of the desired cap ply, typically about ¼"-⅜". This fabric can be made by running a plurality of single end cords in the warp direction. The number of single end cords per inch for cap plys or carcass applications varies depending on the cord construction, and for a particular construction, depending on the tire type and the tire manufacturer. A weft yarn is run in the cross-machine direction. The weft yarn is an elastic yarn which is covered with cotton. The purpose of the weft yarn is to keep the single end cords in continuous, pre-determined proximity of one another.

Typical synthetic yarns useful for the cords of the present invention are made from polyamides, such as 6,6 nylon, 6 nylon, or any copolymers thereof. Alternatively, the yarns may comprise polyesters, aramid fibers, rayon, glass or carbon, etc. A particularly suitable yarn for use with the present invention is T-728, which is a heat stabilized 66 nylon, commercially available from DUSA International of Wilmington, Del. To meet the strength and durability requirements for tire applications, the yarns are normally prepared from high viscosity polymers containing stabilizers and are drawn at high draw ratios to yield high tenacity yarns, as disclosed in U.S. Pat. No. 3,311,691.

Figure 1:
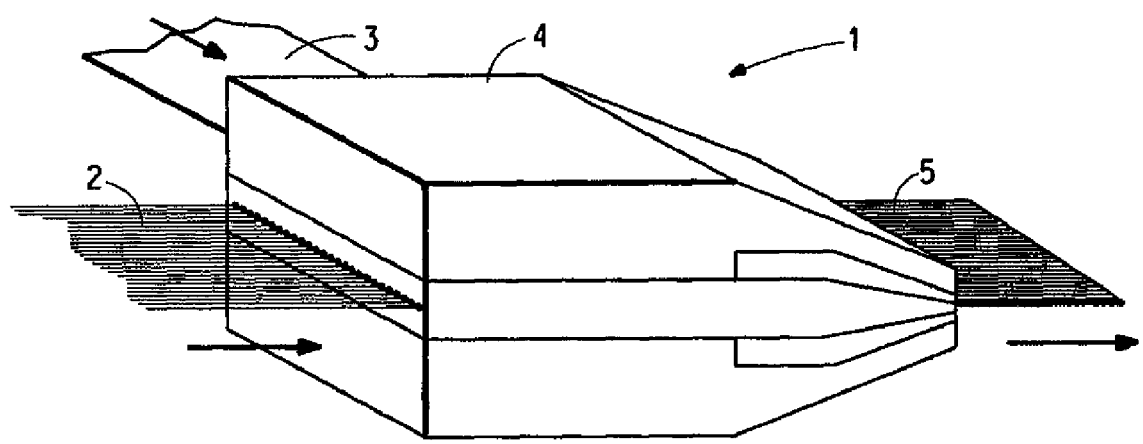
FIG. 1 is a perspective view of a portion of the Steelastic® process of the prior art for making a tire reinforcing tape from single end cord.
Figure 2:
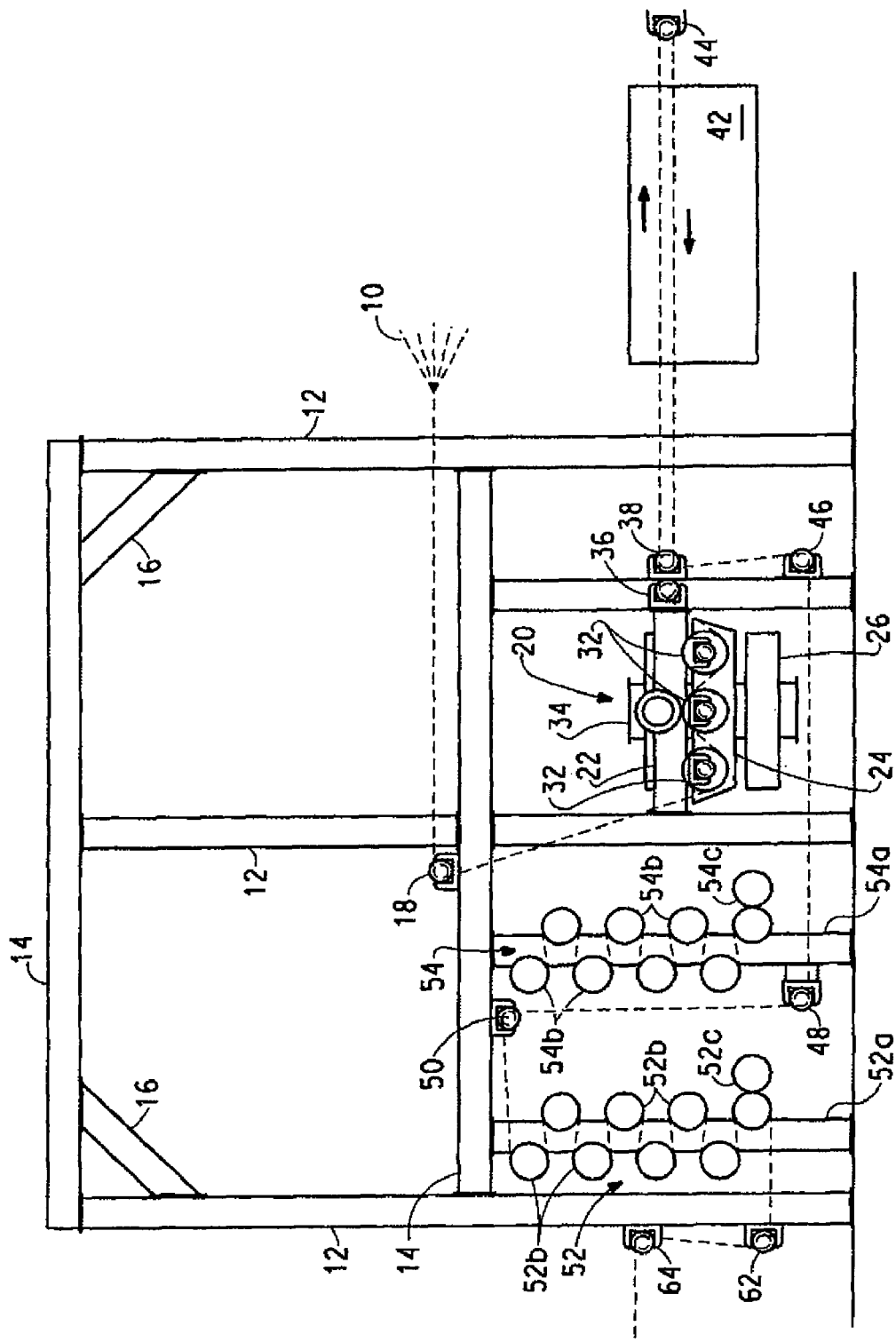
FIG. 2 is a partial elevational view of a portion of the process of the present invention for making a tire reinforcing tape from single end cord.

The greige fabric, shown generally at 10 in FIG. 2, enters the apparatus of the present invention. The apparatus of the present invention includes a frame having a plurality of vertical beams 12, a pair of horizontal beams 14, and a set of braces 16. The greige fabric is typically treated with an activator for bonding rubber to the cords. Typically, a resorcinol-formaldehyde latex (rfl) is used as the activator dip. This process is not shown as it is a standard industry practice. The treated fabric is sent to a guide roll 18, which may be optional, depending on the distance the fabric must travel. The treated fabric is then sent to a dip station, shown generally at 20 in FIG. 2. Dip station 20 includes a take-out 22, a cement dip pan 24 and a mechanism 26 for lifting and lowering the dip pan.

Figure 3:
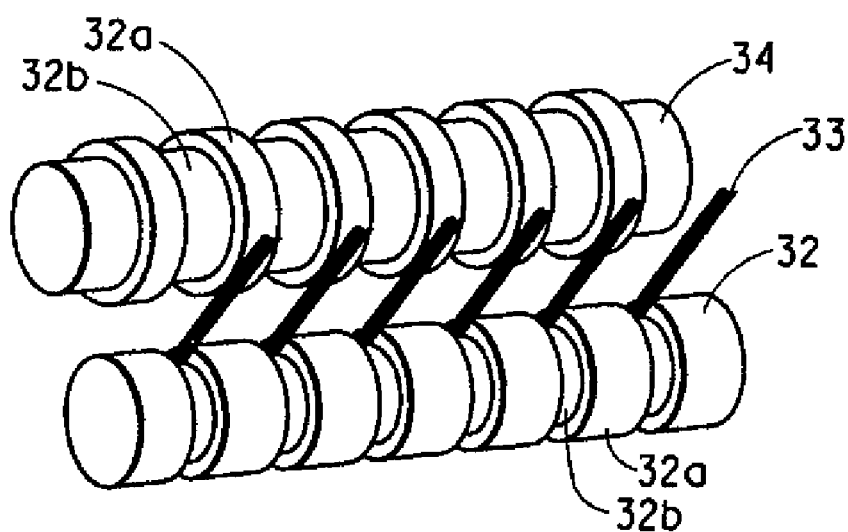
FIG. 3 is a perspective view of the press roll of the present invention.
Figure 4:
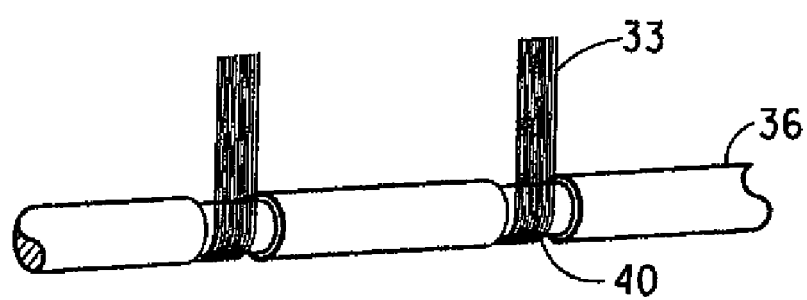
FIG. 4 is a cut-away, perspective view of a guide roll for guiding the tape in the apparatus of the present invention.

The fabric is dipped in the cement dip pan by the mechanism set forth below. As can be seen from FIG. 2 in particular, dip pan 22 includes a plurality of receiving rolls 32. The rolls keep the fabric advancing through the dip pan and ensure that the fabric is submerged in the dip pan. Rolls 32 include a plurality of crests 32a as shown in FIG. 4 and a plurality of grooves, or valleys 32b as shown in FIGS. 3 and 4. The fabric rests in the grooves 32b of the receiving roll. A press roll 34 is disposed above the middle dip pan roll 32. Press roll 34 includes a plurality of crests 34a and valleys 34b. As can be seen from FIG. 4, crests 34a mesh with the valleys 34b of receiving roll 32. It should be noted that several strips of fabric may be dipped at one time. The strips of fabric stay on the crests of the press roll and in the valleys of the dip pan roll to press the cement into the spaces between the strips of fabric as they travel through the dip pan. A solvated, or wet tape, is shown coming out of the grooves of the dip pan roll at 33 in FIG. 4. If several strips of fabric are dipped, guide rolls may be used at this point forward in the process to keep the strips of fabric separate.

Again, variations of the specific equipment used may be made without departing from the scope of the present invention. For instance, if there is enough tension in the fabric as it travels through the dip pan, the use of the press roll may not be necessary. In this case, there just must be enough tension in the fabric to keep it in the valleys of the receiving roll of the dip pan. In this case, an appropriate support, such as a guide roll or a glass bar, can be used for the fabric.

The dip that is used in the dip pan is a solvent-based cement. This solvent-based cement includes an elastomeric composition, which is dissolved in a solvent, such as toluene. This elastomeric composition may comprise, for example, but is not limited to, a natural rubber, or a natural rubber with styrene butadiene or styrene butadiene with polybutadiene. These constituent materials in the elastomeric composition may be mixed with reinforcing agents, activators and/or plasticizers, depending on the needs of the end user. The percentage of solvents in the cement depends on the speed at which the cords are run through the apparatus. This percentage is typically in the range of 10-30%.

Figure 5:
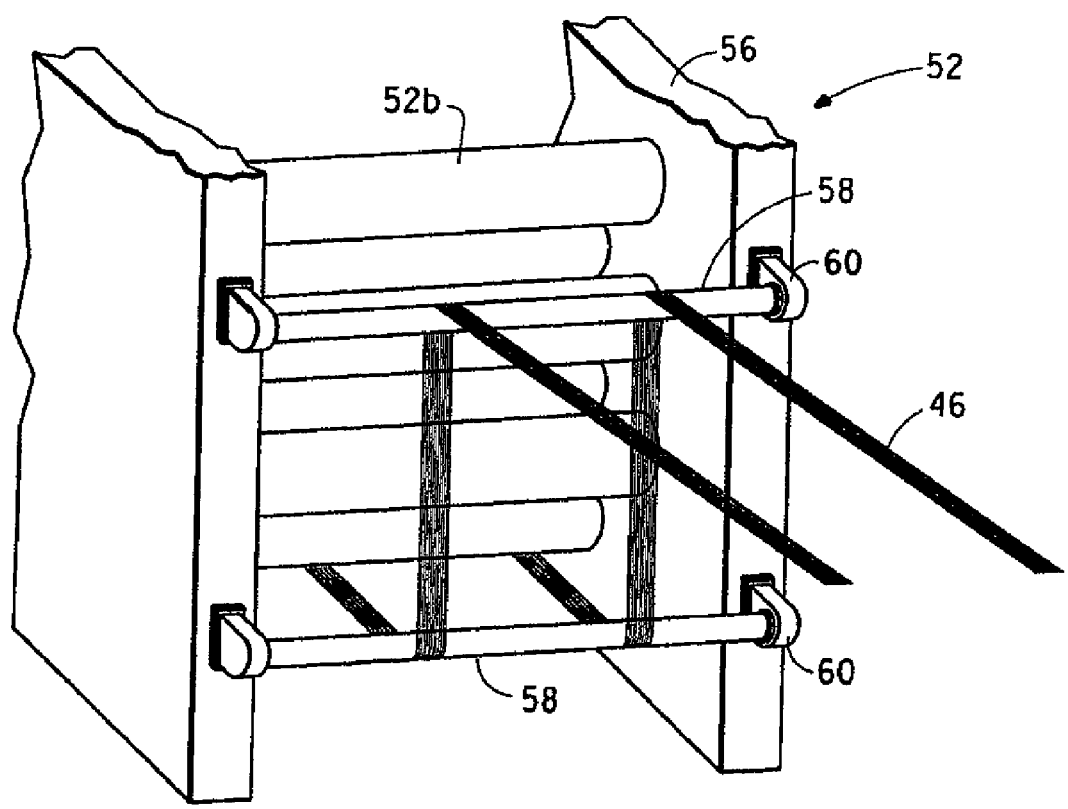
FIG. 5 is a perspective view of the final drive unit of the apparatus of FIG. 2.

The solvated, or wet tape is then sent to a guide roll 36 and to another guide roll 38 as shown in FIG. 2, and more particularly in FIG. 5. FIG. 5 is a cut-away view showing a portion of an exemplary guide roll of the present invention. As can be seen from FIG. 5, grooves 40 are formed in the guide roll for accommodating the solvated tape. It should be noted that rather than using guide rolls for guiding the tape after it leaves the dip pan, sleeves may be used around the guide rolls after the dip pan. The purpose of either the guide rolls or the sleeves is to keep the tape aligned and to prevent it from rolling as it passes out of the apparatus as shown in FIG. 2.

The solvated tape is then sent to an oven 42, where it goes through one pass, to another guide roll 44, and then another pass through the oven. In the oven, the fabric must be fixed in a single plane. This is done by maintaining the tension in the fabric, and is necessary to maintain the integrity of the tape. The cement, including the solvent and the elastomeric composition, are dried in the oven. This drying typically occurs at about 110° C. for some period of time, which is dependent on the speed at which the greige fabric is being driven through the apparatus. The drying drives off, or evaporates, the majority of the solvent. What remains is the ready to apply fabric, encapsulated in the elastomeric composition, thereby forming the tape. This tape is shown at 46 in FIG. 6. In the final product, some small residual amount of solvent remains as a component of the tape. The solvent may comprise 0.0009-5% of the weight of the tape.

From the oven, the tape is sent back through guide roll 38, to a series of guide rolls, 46, 48 and 50, and to a drive unit, shown generally at 52 in FIGS. 2 and 5. Another drive unit 54, including shaft 54a and rolls 54b and 54c, is optional, and is used only when drive unit 52 is not operational. As can be seen from FIG. 2, drive unit 52 includes a shaft 52a and geared rolls 52b and 52c, for driving the tape through the apparatus. As shown in FIG. 5, the drive unit is supported in a frame 56, which includes a support bar 58 for presenting the tape as it moves through the apparatus. The support roll is held between a pair of supports 60.

Figure 6:
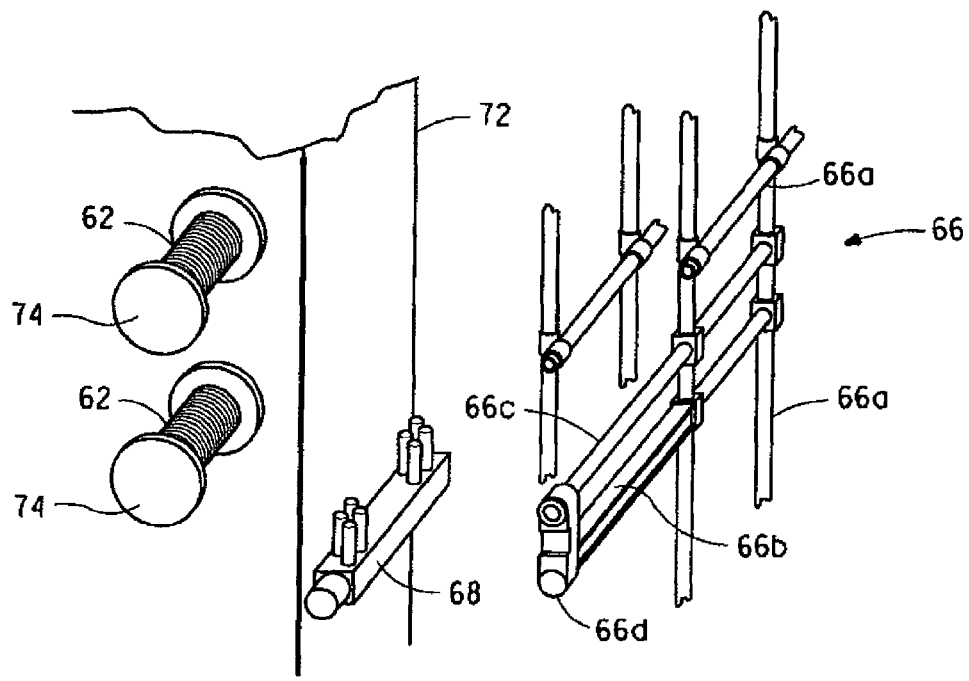
FIG. 6 is a perspective view of a comb for guiding the tape of the present invention to a winder.
Figure 7:
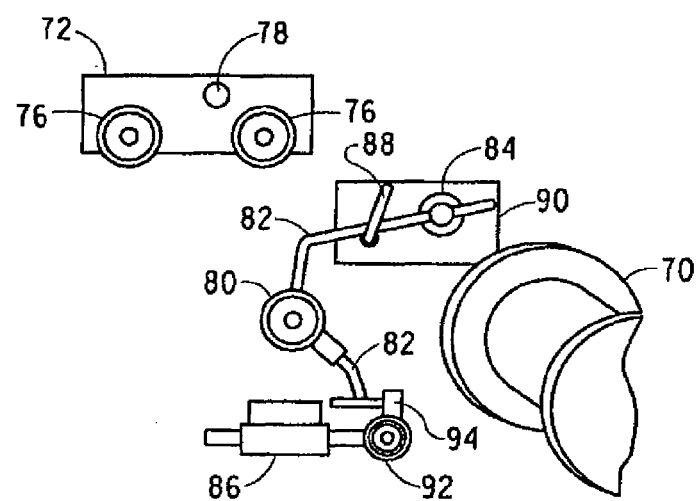
FIG. 7 is an elevational view of the winder of the present invention.

The tape, which is shown at 62 in FIG. 6, is then sent to a pair of type-two guide rolls, 62 and 64 and to a mechanism 66 for presenting the tape to an optional comb 68 as shown in FIG. 6. Mechanism 66 includes vertical supports 66a, a horizontal bar 66b as well as a roller 66c. The bar and the roller are held together by an end cap 66d. The tape rolls over roller 66c and is advanced to comb 68. The comb of FIG. 6 is similar to a comb used in a known single end cord process to keep the cords separated, except that in the comb of FIG. 6 has less teeth, and the teeth are more widely spaced, than a comb used in a known single end cord process, in order to accommodate the tape. The tape is then sent to a winder 70, which is supported by a framework 72 as shown in FIG. 7. After the winder, the tape is sent to a bobbin 74, where it is wound and stored. A pair of bobbins is shown in FIG. 7.

After the comb, the tape is sent to a guide wheel 76 as shown in FIG. 7. The guide wheel is held onto the framework 72 of the winder by a fastener 78. From guide wheel 76 the tape is sent to another guide wheel 80. Similar guide wheels can be found in a known apparatus for making single end cord; however, such guide wheels have crests and valleys for accommodating the single end cords. In contrast, in the apparatus of the present invention, the surfaces of both guide wheels 76 and 80 do not have crests and valleys, but rather are smoothed out to accommodate the tape. The use of such a guide wheel is optional in the present invention, and is used to ensure that the tape stays in place. As the tape moves from guide wheel 76 to guide wheel 80 and to the final package (i.e., the winder 70 with tape wound on it), the tension in the tape is maintained by a dancer arm 82. The end of the dancer arm pivots about an upper pivot point 84, and about a lower pivot point 86. The movement of the dancer arm is limited by a lower limit device 88, which keeps the dancer arm from hitting against the bobbin. Upper pivot point 84 and lower limit device 88 are held against the framework by a plate 90, which fastens to the framework of the winder. A guide roll 92 guides the tape to a guide 94, through which the tape travels to be presented to the final package.

With the present invention, because the individual cords are dipped in a cement, the cords have better access to the cement than to rubber in the prior art, because rubber does not flow as well as cement. Thus more complete coverage of the fabric, and the cords in the fabric can be achieved as compared to processes of the prior art. Consequently, with the present invention it is possible to produce a superior tape as compared to the slit fabric or STEELASTIC® Cap Strip System. While it might be possible to achieve the desired encapsulation characteristics for elastomeric compositions such as rubber at high heat and high pressures, the present invention is able to achieve these desired encapsulation characteristics at ambient temperature and ambient pressure while the cement is being applied.

The tape of the present invention is ready to use as a cap ply for a tire. When used in this application, the tape is wound directly onto the tire. The single end cord in the tape then adheres to the rubber in the tire curing process. Alternatively, as noted above, the tape may be used as a breaker and reinforcement in the carcass of tires. The tape of the present invention is generally about ¼" to ⅜" wide.

The invention will be described in greater detail with reference to the following example which is intended to illustrate the invention without restricting the scope thereof.

EXAMPLE

A tape was made using the apparatus of FIG. 2 as described above. A greige, single weft tire cord fabric made from nylon 6,6 was sent through the apparatus to a pre-dip pan where rfl dip was applied. The dip in the pre-dip pan was made by adding water, sodium hydroxide (NaOH), or caustic pellets, resourcinol flake and formaldehyde to a tank. This solution had a solids content of about 6%. The solution was mixed for approximately 30 minutes. This solution was then aged for a minimum of about 3 hours (minimum of 2 hours, maximum of 4 hours). In another tank, a latex was added. Then water was mixed with ammonium hydroxide, $NH_4OH$ and added to the latex slowly. Then an anti-foaming agent was added and this was mixed slowly. This solution had a solids content of about 35%. This solution was then combined with the solution from the first tank. The combined solutions were mixed together for about 30 minutes prior to use. The fabric was dipped in this combined solution for about 3 seconds. The dip was cured at a temperature of about 226° C., for a dwell time in the range of 100 and 200 seconds. The fabric was then sent to another oven, where the dip was cured at a temperature of 165° C. The fabric was then dipped in a mixture of toluene (85 kg) and a rubber-based elastomeric composition (15 kg). The toluene and the elastomeric composition were dried in an oven at a temperature of 110° C., so that the majority of the toluene was driven off. A tape which was ½ inch wide was formed.

I claim:

1. A process for producing a tire cap ply tape wherein the tire cap ply tape comprises a width of about ¼ inch to about ⅜ inch, the method consisting:
  a) running a plurality of single end cords in a warp direction;
  b) weaving a weft yarn through the plurality of single end cords in a cross-machine direction to form a greige fabric, wherein the width of the greige fabric is about ¼ inch to about ⅜ inch;
  c) treating the greige fabric with an activator;
  d) directing the greige fabric into a cement dip pan comprising a plurality of receiving rolls and a press roll wherein the receiving rolls and press roll each comprise crests and grooves adapted to accept the greige fabric, and wherein the dip pan contains a solvent-based cement comprising a solvent and an elastomeric composition;

e) at ambient temperature and pressure, advancing the greige fabric through solvent-based cement by running said fabric through the rolls of the dip pan whereby the fabric rides through the grooves of the receiving rolls and on the crests of the press roll to form a solvated tape;

f) guiding the tape from the dip pan to an oven using at least one guide roll wherein the guide roll comprises grooves for accommodating the solvated tape;

g) drying the solvated tape in the oven whereby the majority of the solvent evaporates, and the elastomeric composition remains, encapsulating the greige fabric to form the tire cap ply tape; and h) winding the tire cap ply tape on a bobbin using a winder wherein the tire cape ply tape is stored on the bobbin.

2. The process of claim 1 wherein the activator comprises resourcinol-formaldehyde latex.

3. The process of claim 1 wherein the solvent is toluene.

4. The process of claim 1 wherein the elastomeric composition is selected from the group consisting of natural rubber, a natural rubber with styrene butadiene or styrene butadiene with polybutadiene.

5. The process of claim 1 wherein the weft yarn is an elastic yarn.

6. The process of claim 1 wherein the weft yarn is covered with cotton.

* * * * *